(12) United States Patent
Raio et al.

(10) Patent No.: US 11,974,576 B2
(45) Date of Patent: May 7, 2024

(54) GAS POWERED PIZZA OVEN

(71) Applicant: STEARNS PRODUCT DEVELOPMENT CORPORATION, Perris, CA (US)

(72) Inventors: Scott Andrew Raio, Irvine, CA (US); Brad Kent, Pasadena, CA (US); Steve Raio, Canyon Lake, CA (US)

(73) Assignee: Banana Stand Brands LLC, Irvine, CA (US)

( * ) Notice: Subject to any disclaimer, the term of this patent is extended or adjusted under 35 U.S.C. 154(b) by 434 days.

(21) Appl. No.: 17/318,244

(22) Filed: May 12, 2021

(65) Prior Publication Data

US 2021/0392904 A1  Dec. 23, 2021

Related U.S. Application Data

(60) Provisional application No. 63/042,788, filed on Jun. 23, 2020.

(51) Int. Cl.
| | |
|---|---|
| *A21B 1/28* | (2006.01) |
| *F23D 14/10* | (2006.01) |
| *F23D 23/00* | (2006.01) |
| *F24C 3/08* | (2006.01) |
| *F24C 3/12* | (2006.01) |
| *F24C 15/08* | (2006.01) |
| *F24C 15/16* | (2006.01) |

(52) U.S. Cl.
CPC ............... *A21B 1/28* (2013.01); *F23D 23/00* (2013.01); *F24C 3/087* (2013.01); *F24C 3/128* (2013.01); *F24C 15/08* (2013.01); *F24C 15/16* (2013.01); *F23D 14/10* (2013.01)

(58) Field of Classification Search
CPC . A21B 1/28; F23D 23/00; F24C 3/087; F24C 3/128; F24C 15/08; F24C 15/16
USPC ........................................................ 126/39 K
See application file for complete search history.

(56) References Cited

U.S. PATENT DOCUMENTS

| | | | | |
|---|---|---|---|---|
| 5,241,947 | A * | 9/1993 | Sandolo | A21B 1/24 126/273 R |
| 10,624,353 | B1 * | 4/2020 | Langley | A21B 1/52 |
| 2015/0184865 | A1 * | 7/2015 | Ricci | A21B 1/48 126/39 E |

(Continued)

*Primary Examiner* — Vivek K Shirsat
(74) *Attorney, Agent, or Firm* — Stetina Brunda Garred & Garred

(57) ABSTRACT

A gas-powered oven includes a cooking surface and a heat deflecting frame, such that the cooking surface and heat deflecting frame collectively define at least a portion of a cooking chamber. An outer housing extends around the cooking surface and the heat deflecting frame, with the outer housing having an opening formed therein and in communication with the cooking chamber. A first burner is connectable to a gas source and is located within the outer housing and spaced from the cooking chamber. The first burner is elongate and includes a first array of openings formed therein. A second burner is connectable to the gas source and extends into the cooking chamber toward a portion of the heat deflecting frame. The second burner includes a tapered passageway and an expanding passageway downstream of the tapered passageway to achieve desired flow characteristics of the gas flowing through the second burner.

20 Claims, 7 Drawing Sheets

(56) References Cited

U.S. PATENT DOCUMENTS

2018/0180292 A1\* 6/2018 Wang ................. A21B 1/33
2019/0195502 A1\* 6/2019 Tseng ................. F24C 3/004

\* cited by examiner

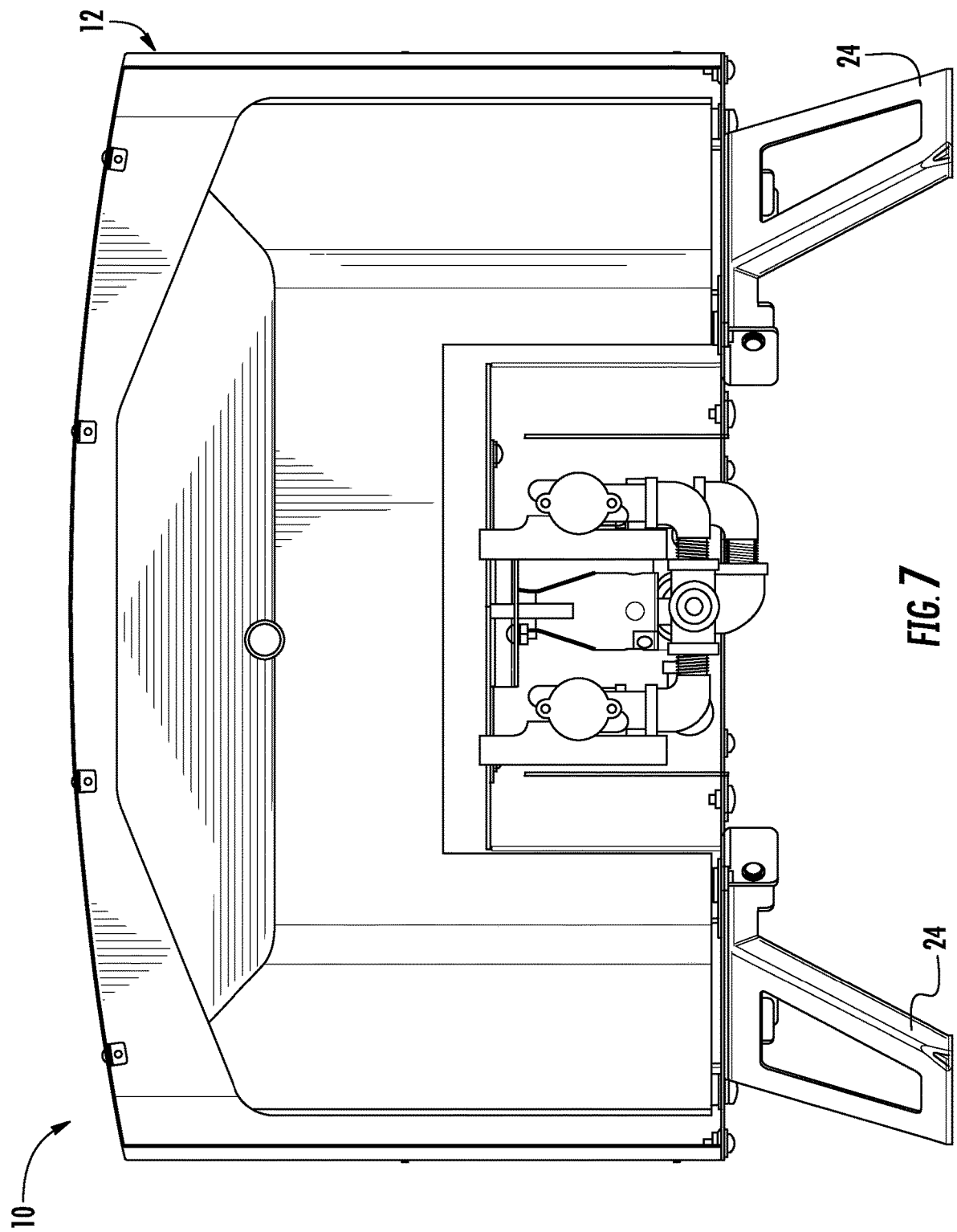

GAS POWERED PIZZA OVEN

CROSS-REFERENCE TO RELATED APPLICATIONS

This application claims priority to U.S. Provisional Application Ser. No. 63/042,788, filed Jun. 23, 2020, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a gas powered oven, and more specifically to a gas powered oven having at least two burners and an internal heat deflecting frame to create uniform heat distribution within a cooking chamber to achieve optimal cooking conditions, particularly for food items such as pizza.

2. Description of the Related Art

Pizza is a very popular food that is enjoyed by many on a regular basis. Indeed, most communities have several restaurants or other establishments that serve pizza or provide pizza on a take-out or delivery basis.

Although the quality of the dough and other ingredients used in making the pizza will have an impact on the overall taste and texture of the pizza, it is understood that particular cooking conditions are required to create the optimal pizza. Along these lines, in the case of most pizzas, cooking the pizza at a high temperature will allow the crust to set and brown without frying the cheese and toppings. Accordingly, many restaurants that offer pizza include a specialized oven that can achieve uniform, high temperatures needed to make high-quality pizza.

The requirement of creating high, uniform temperature for cooking high-quality pizza has been an impediment for at-home pizza making. Conventional ovens found in most homes are typically limited in their ability to generate temperatures high enough to make restaurant-quality pizza.

In view of this deficiency, various oven manufacturers have attempted to develop an at-home oven that is compact enough for use in a typical residential setting, while also being capable of generating enough heat to sufficiently cook the pizza. To date, these efforts have not succeeded in providing a residential pizza oven that cooks pizza to the quality that is comparable to that of a restaurant. In most cases, such at-home pizza ovens fail to provide sufficiently high temperatures throughout the pizza oven. As a result, the pizzas cooked by those ovens may be cooked unevenly, in which some portions may be burned, while other portions may be undercooked.

Accordingly, there is a need in the art for a pizza oven sized for residential use that can attain sufficiently high temperatures for cooking a pizza and ensure the high temperatures are achieved throughout a cooking chamber within the oven. Various aspects of the present disclosure address this particular need, as will be discussed in more detail below.

BRIEF SUMMARY

In accordance with one embodiment of the present disclosure, there is provided a gas-powered oven for heating and/or cooking a food item. The oven includes an inner frame defining a cooking chamber having an opening. The cooking chamber is sized and configured to receive the food item, via the opening, for heating and/or cooking the food item therein. The inner frame includes a pair of opposed sidewalls disposed on opposite sides of a central axis, and a vaulted ceiling connected to the pair of opposed sidewalls. The vaulted ceiling includes a central section, a rear section extending downwardly from the central section, and a front section spaced from the rear section and extending downwardly from the central section. A cooking plate is disposed within the cooking chamber, with the cooking plate having an upper surface parallel to the central axis. A first burner is configured to be connectable to a gas supply and is positioned such that the cooking plate resides between the first burner and the vaulted ceiling. A second burner is configured to connectable to the gas supply and extends along a second burner axis that intersects the vaulted ceiling. The second burner includes a tapered passageway and an expanding passageway downstream of the tapered passageway to achieve desired flow characteristics of the gas flowing through the second burner.

The first burner may include a tapered passageway and an expanding passageway downstream of the tapered passageway to achieve desired flow characteristics of the gas flowing through the first burner. The first burner may include an elongate body having a first array of openings formed therein, and a second array of openings formed therein and in opposed relation to the first array of openings.

The second burner may include a body extending about the second burner axis and defining the tapered passageway and the expanding passageway. The body may define a terminal end residing between a plane defined by the upper surface of the cooking plate and the vaulted ceiling.

The vaulted ceiling may include a pair of side sections, each extending downwardly from the central section in opposed relation to each other toward respective ones of the pair of sidewalls. The vaulted ceiling may include an arcuate wall defining the central section.

The oven may also include a gas inlet configured to be fluidly connectable to a gas source, with the gas inlet being in fluid communication with the first burner and the second burner. A manifold may be in fluid communication with the gas inlet, the first burner, and the second burner. The manifold may be configured to receive gas from the gas inlet and deliver received gas to the first burner and the second burner.

The oven may also include a first control valve connected to the manifold. The first control valve may be selectively transitional between an open position, wherein gas is permitted to flow from the manifold to the first burner, and a closed position, wherein gas is prevented from flowing from the manifold to the first burner. The oven may further comprise a second control valve connected to the manifold. The second control valve may be selectively transitional between an open position, wherein gas is permitted to flow from the manifold to the second burner, and a closed position, wherein gas is prevented from flowing from the manifold to the second burner.

The oven may additionally include a pair of side brackets connected to respective ones of the sidewalls and configured to support the cooking plate. Each side bracket may include at least one cutout to facilitate heat transfer along the respective one of the sidewalls.

The oven may also include insulation extending over at least the vaulted ceiling.

An outer housing may surround at least a portion of the inner frame, and a plurality of legs may be connected to the outer housing for supporting the oven on an underlying support surface.

According to another embodiment, there is provided a gas-powered oven for heating and/or cooking a food item. The oven includes a cooking surface and a heat deflecting frame extending at least partially around the cooking surface, such that the cooking surface and heat deflecting frame collectively define at least a portion of a cooking chamber sized to receive the food item. An outer housing extends around the cooking surface and the heat deflecting frame, with the outer housing having an opening formed therein and in communication with the cooking chamber. A first burner is connectable to a gas source and is located within the outer housing and spaced from the cooking chamber. The first burner is elongate and includes at least a first array of openings formed therein. A second burner is connectable to the gas source and extends into the cooking chamber toward a portion of the heat deflecting frame. The second burner includes a tapered passageway and an expanding passageway downstream of the tapered passageway to achieve desired flow characteristics of the gas flowing through the second burner.

The heat deflecting frame may include a vaulted ceiling positioned over the cooking surface and a plurality of sidewalls extending downwardly from the vaulted ceiling.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 7 is a rear view of the pizza oven.

Common reference numerals are used throughout the drawings and the detailed description to indicate the same elements.

DETAILED DESCRIPTION

Figure 1:
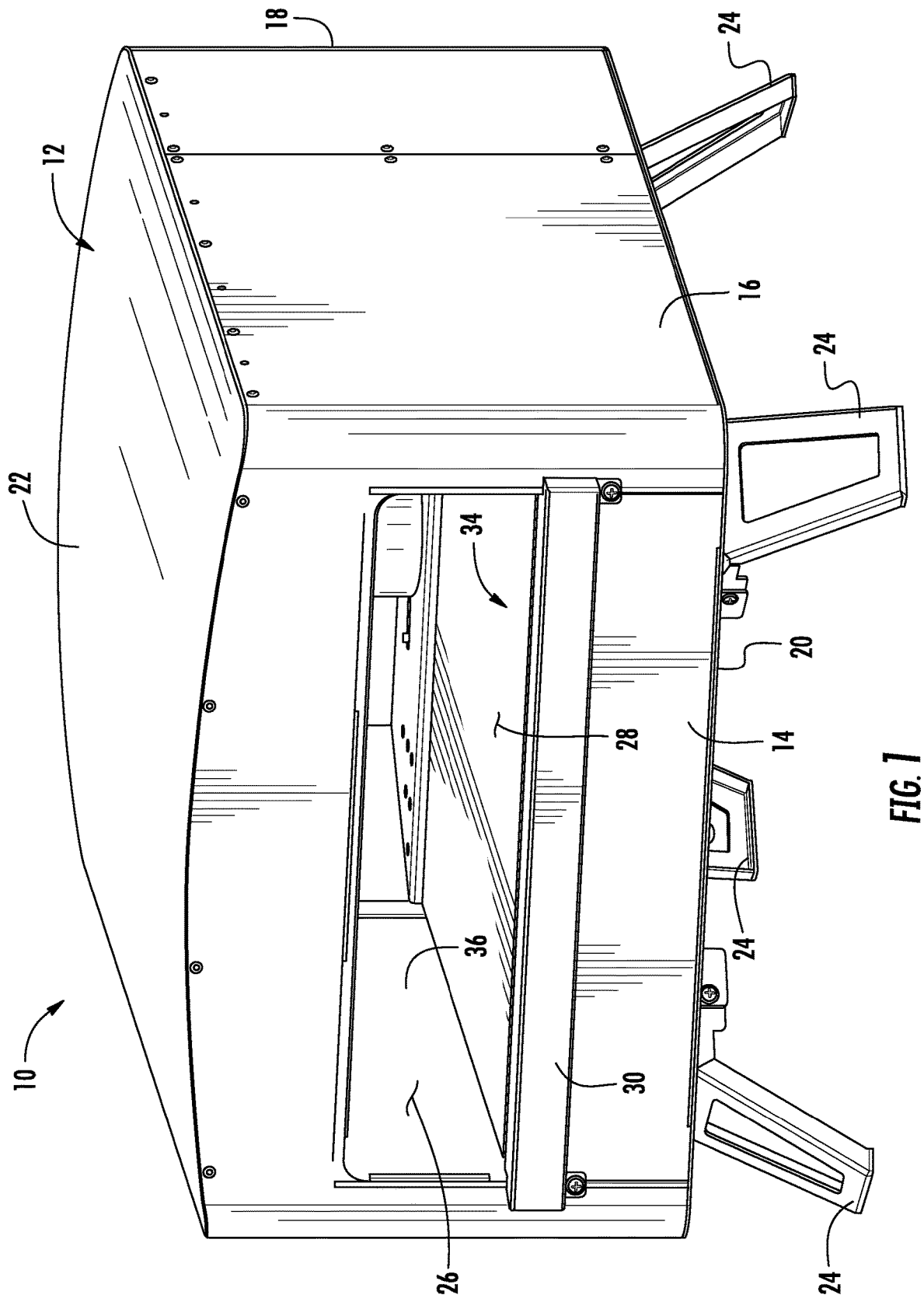
FIG. 1 is an upper perspective view of a gas-powered pizza oven according to one embodiment of the present disclosure.
Figure 2:
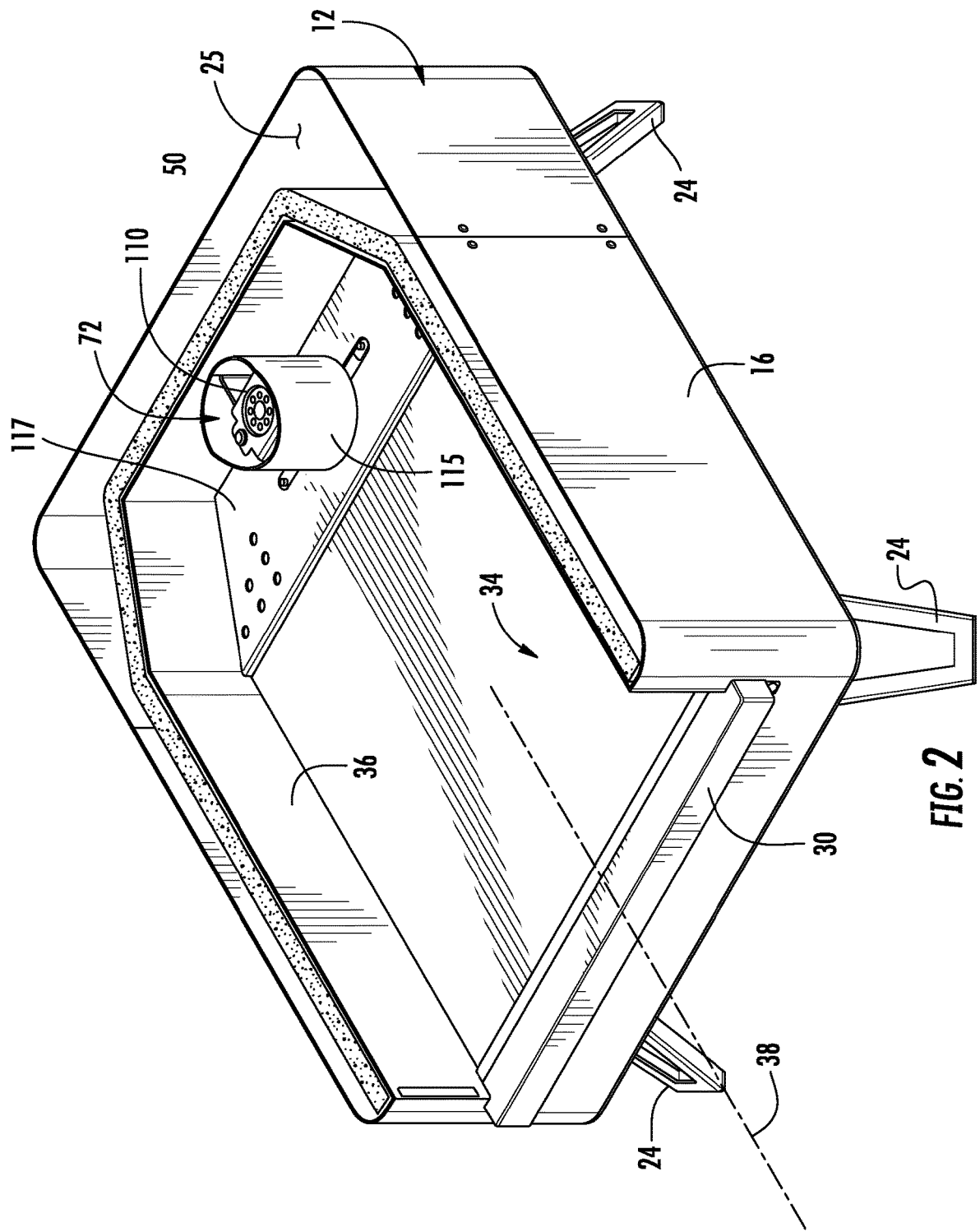
FIG. 2 is an upper perspective, cross-sectional view of the pizza oven.
Figure 3:
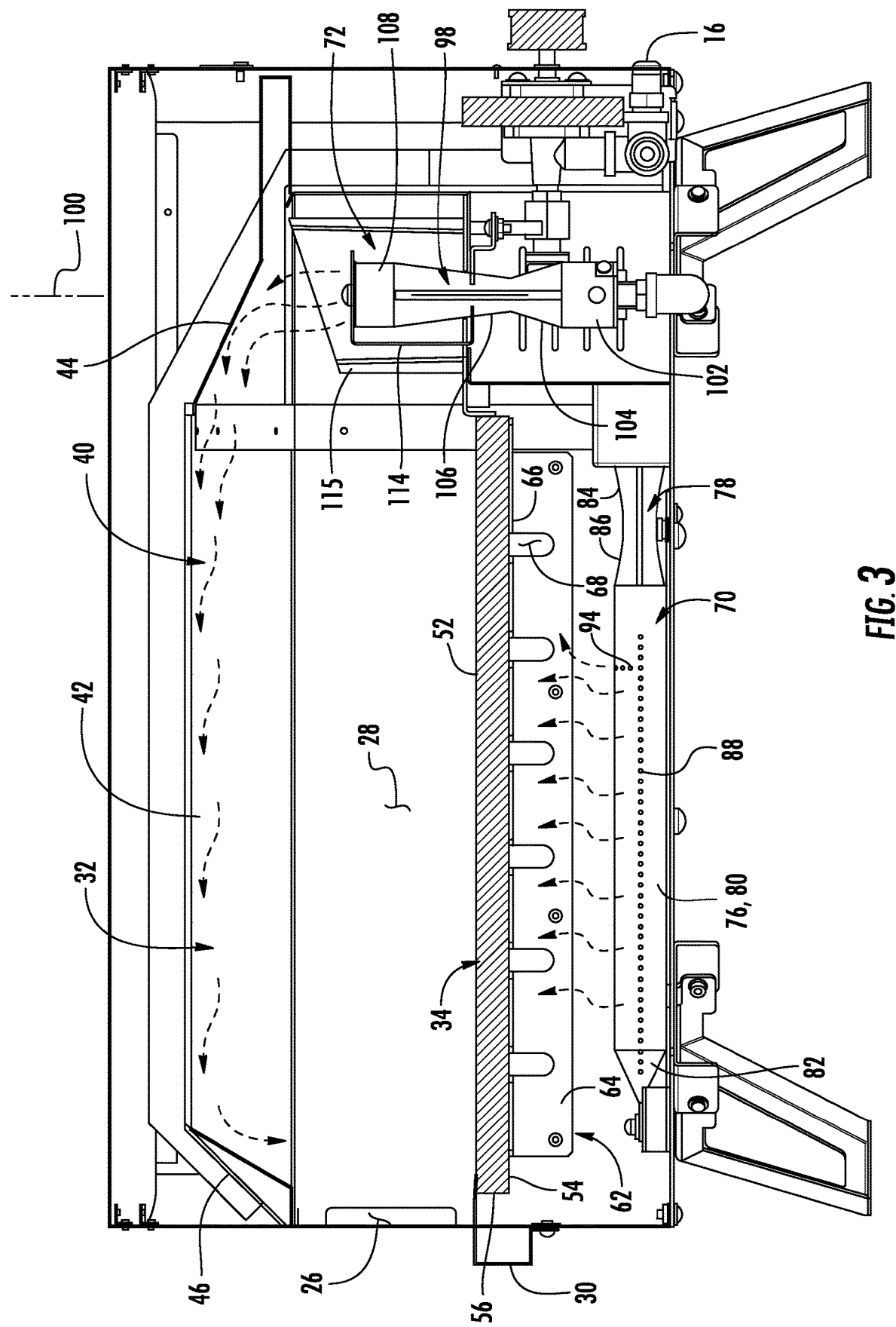
FIG. 3 is a side, cross-sectional view of the pizza oven.
Figure 4:
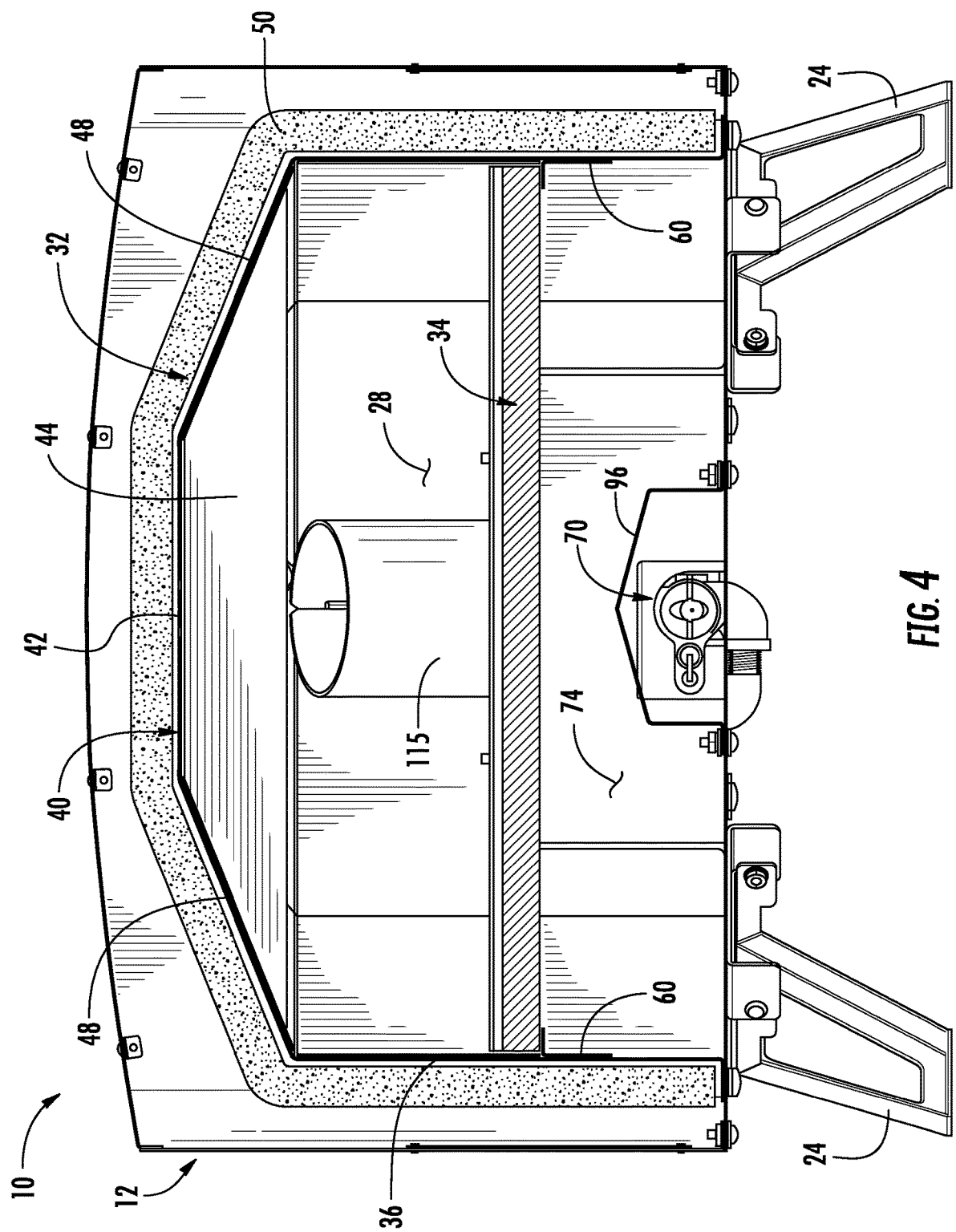
FIG. 4 is a front, cross-sectional view of the pizza oven.
Figure 5:
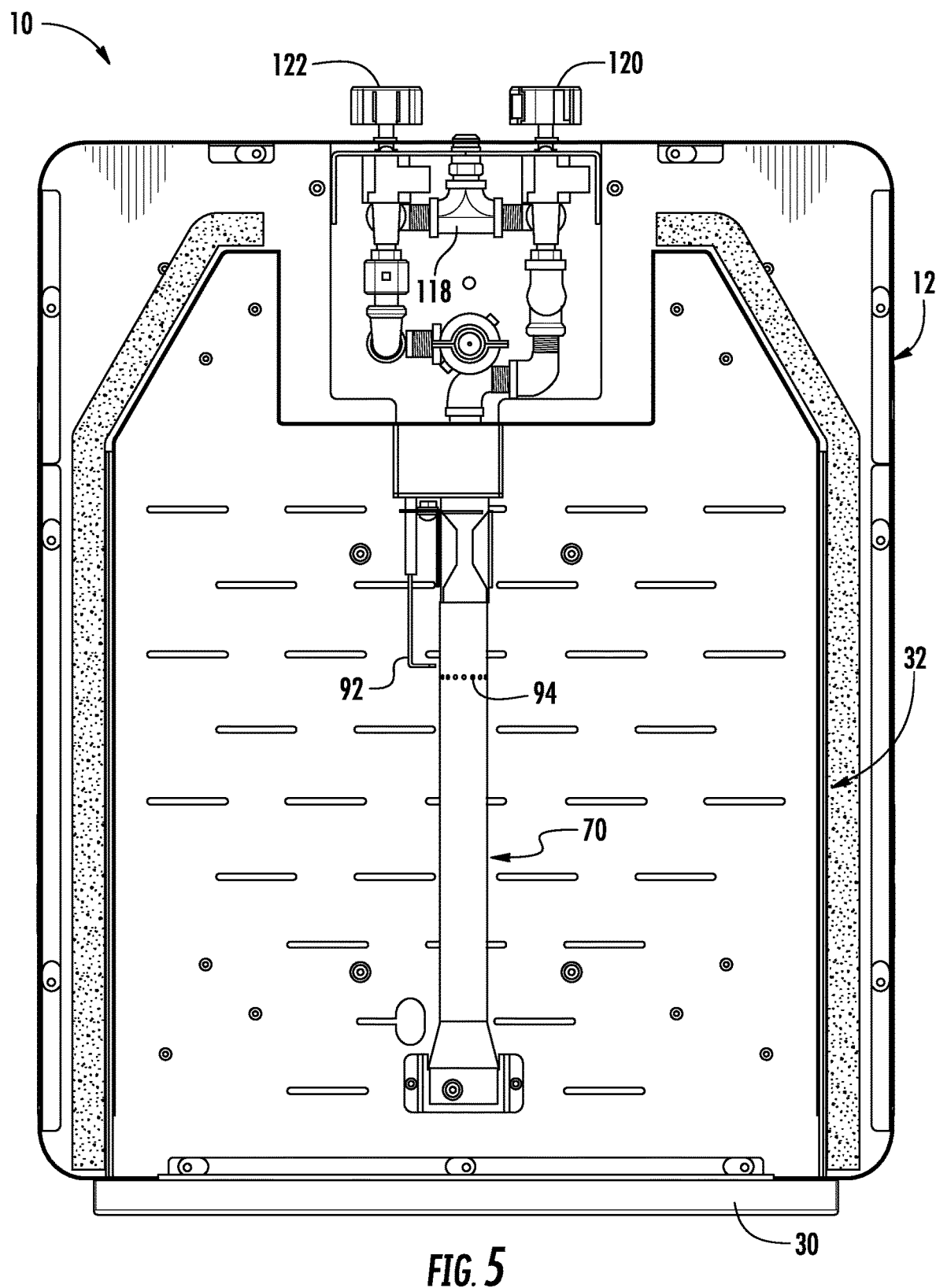
FIG. 5 is a top, cross-sectional view of the pizza oven.
Figure 6:
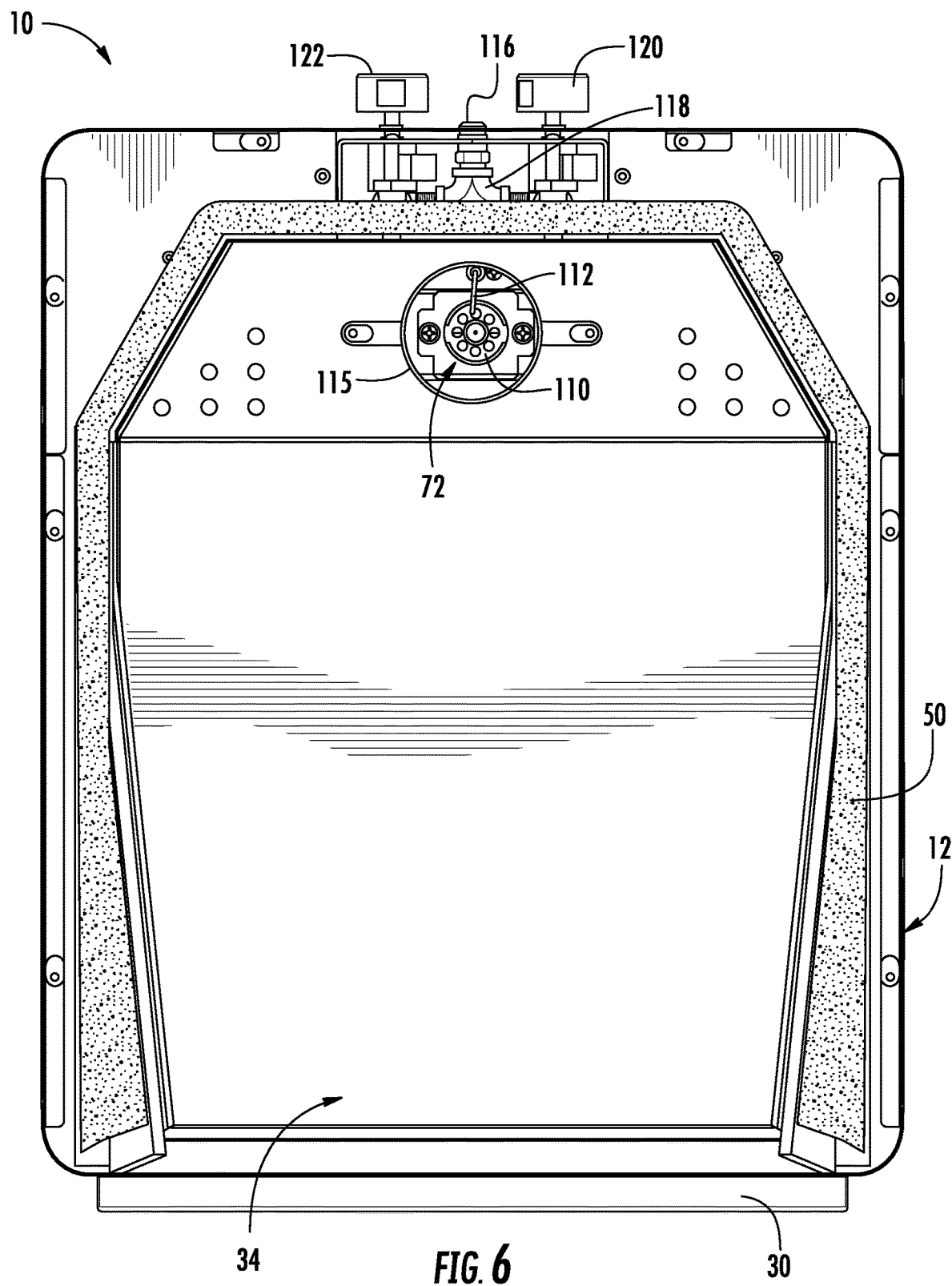
FIG. 6 is a top, cross-sectional view of the pizza oven taken from a cross sectional plane above that which is depicted in FIG. 5.

The detailed description set forth below in connection with the appended drawings is intended as a description of certain embodiments of a gas powered pizza oven and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, wherein the showings are for purposes of illustrating a preferred embodiment of the present disclosure, and is not for purposes of limiting the same, there is depicted a gas-powered oven 10 for heating and/or cooking a food item, such as pizza, flatbread, or the like. The oven 10 includes a pair of burners and an inner heat-deflecting frame which provides sufficiently high, uniform heat within a cooking chamber of the oven 10 to create restaurant-quality food and pizzas at home.

In more detail, the oven 10 includes an outer housing 12 having a front surface 14, a pair of side surfaces 16, a rear surface 18, a lower surface 20, and an upper surface 22. The upper surface 22 may be slightly arcuate or domed for aesthetic purposes, as well as to accommodate the contours of an internal heat reflective ceiling, as will be described in more detail below. A plurality of legs 24 are connected to the lower surface 20 and are configured to support the oven 10 on an underlying support surface, such as a countertop, table, outdoor bar, etc. In this regard, the overall size of the outer housing 12 is small enough for use in a residential setting, and may also be sufficiently sized to enable a user to carry the oven 10 around the residence, such as from a position where the oven may be stored, to a position where the oven may be used. It is also contemplated that the oven 10 may be sized to allow for transport thereof, e.g., for use when camping or at a picnic.

An opening 26 is formed in the front surface 14 of the outer housing 12, with the opening 26 being in communication with a cooking chamber 28. The opening 26 is sized and configured to allow for insertion of a pizza, flatbread or other food item into the cooking chamber 28 for cooking, and subsequent removal of the food item (e.g., pizza) when cooking (or heating) has been completed. A lower trim 30 may be fastened to the front surface 14 and may be configured as an extension of the cooking surface, extending out of the opening 26.

Inside of the outer housing 12, the oven 10 includes an inner heat deflecting frame 32 and a cooking plate 34, which collectively define the cooking chamber 28. The cooking chamber 28 may be sized to accommodate a single, large pizza, or alternatively, several smaller pizzas. The inner frame 32 may be separated from the outer housing 12 by a gap 25 to mitigate heat loss from the cooking chamber 28. The configuration of the inner frame 32 may be specifically configured to deflect heat emitted by the burners toward the cooking plate 34. Along those lines, and according to one embodiment, the inner frame 32 includes a pair of opposed sidewalls 36 disposed on opposite sides of a central axis 38, which passes through the opening 26 formed in the outer housing 12. The inner frame 32 additionally includes a vaulted ceiling 40 connected to the pair of opposed sidewalls 36. The shape and configuration of the vaulted ceiling 40 may be generally domed shaped, such that a central section 42 thereof is higher than the adjacent sections. Accordingly, the vaulted ceiling 40 may include a rear section 44 extending downwardly from the central section 42, and a front section 46 spaced from the rear section 44 and extending downwardly from the central section 42. The vaulted ceiling 40 may additionally include a pair of side sections 48, each extending downwardly from the central section 42 in opposed relation to each other toward respective ones of the pair of sidewalls 36. The configuration of the vaulted ceiling 40 may be arcuate with the curve having an apex at the central section 42, or alternatively, the vaulted ceiling 40 may be formed by a plurality of planar surfaces that are angled upwardly from the sidewalls 36 toward the central section 42. Insulation 50 may extend over the inner frame 32 to mitigate heat loss from the cooking chamber 28.

A cooking plate 34 is disposed within the cooking chamber 28, with the cooking plate 34 having an upper cooking surface 50 parallel to the central axis 38. The cooking plate 34 is configured to have the pizza or other food item placed directly thereon for cooking. Suitable materials for the cooking plate 34 may include clay, ceramic, cast iron, cordierite, stone, or other materials known in the art. It is contemplated that the cooking plate 34 may be configured to be removable from the cooking chamber 28 for cleaning, replacement, or to swap one cooking plate 34 for another in the event one cooking plate 34 is more suitable than another for cooking a particular food item. For instance, one particular cooking plate 34 may be preferred when cooking a pizza, while another cooking plate 34 may be preferred when cooking a steak. The cooking plate 34 may define a thickness as the distance between the upper cooking surface 52 and an opposing bottom surface 54. According to one embodiment, the thickness may be approximately ⅝". The cooking plate 34 may also define a length as the distance between a forward edge 56 and a rearward edge 58, and a width as the distance between opposed side edges 60 thereof. In one embodiment, the length is approximately 15" and the width is also approximately 15 inches, although other sizes and configurations are contemplated without departing from the spirit and scope of the present disclosure.

The cooking plate 34 may be supported by a pair of side brackets 62, with each side bracket 62 being secured to a respective sidewall 36. Each bracket 62 may include a mounting section 64 and a support section 66 extending approximately 90 degrees from the mounting section 64. The mounting section 64 is configured to be attached to the respective sidewall 36 via a rivet, nail, adhesive or other fastener known in the art. The support section 66 extends from the mounting section 64 and under the cooking plate 34.

According to one embodiment, each side bracket 62 may include at least one, and preferably several, cutouts or voids 68 formed therein to facilitate heat transfer along the respective one of the sidewalls 36. In particular, each void 68 may extend through a portion of the mounting section 64 and a portion of the support section 66 to allow heat emitted from a burner positioned below the cooking plate 34 to flow through the side bracket 62 and between a small gap between the cooking plate 34 and the sidewall 36 to provide uniform heat at a lower side portion of the cooking chamber 28.

As noted above, the pizza oven 10 may include a pair of burners for generating heat within the cooking chamber 28. In particular, the pizza oven 10 may include an elongate, lower burner 70 extending in a generally horizontal direction, and a rear burner 72 extending in a generally vertical direction.

Referring to the lower burner 70 first, the position of the lower burner 70 is such that the cooking plate 34 resides between the lower burner 70 and the vaulted ceiling 40. In this regard, the lower burner 70 is spaced from the cooking chamber 28, and instead, is in a lower burner chamber 74 separated from the cooking chamber 28 by the cooking plate 34. The lower burner 70 may include an elongate body 76 including a rear portion 78, an intermediate portion 80 and a forward portion 82. The elongate body 76 may be mounted to the outer housing 12 at both the rear portion 78 and the forward portion 82 to secure the elongate body 76 thereto.

The rear portion 78 may be connectable to a gas source to receive gas therefrom. The rear portion 78 may include a specifically configured contour to generate desired fluid flow characteristics of the gas flowing therethrough. In particular, the rear portion 78 may include a tapered passageway 84 and an expanding passageway 86 downstream of the tapered passageway 84, similar to a venturi, so as to increase the velocity of the gas flowing therethrough.

The intermediate section 80 may be cylindrical and include a first array of openings 88 formed on a first side thereof, and a second array of openings 88 formed on a second side thereof in opposed relation to the first array of openings 88. The openings 88 allow the gas, flowing through the inside of the intermediate section 80 under pressure, to exit the inside of the intermediate section 80. An igniter 92 may be positioned adjacent one or more of the openings 88 to ignite the gas as it exits the openings 88. The adjacent positioning of the openings 88 in a given array results in the ignited gas within that array to subsequently ignite the gas exiting the remaining openings in that same array. The intermediate section 80 may also include an array of linking openings 94 extending over the top of the intermediate section 80 between the two arrays of openings 88, to allow the flame to cross over the burner 70 from one side to the other. In this regard, when one side of the burner 70 is ignited, the flame may pass over the linking openings 94 to the opposite array of openings to ignite the opposite side.

The forward portion 82 of the lower burner 70 may be tapered to define a decreasing diameter as the forward portion 82 extends away from the intermediate portion 80. The forward portion 82 may also include one or more openings formed therein in alignment with the openings 88 in the intermediate portion 80 to form a continuation of the arrays.

The lower burner 70 may be at least partially covered by a heat guard 96, which may extend over the lower burner 70 so as to prevent anyone from inadvertently touching the lower burner 70, such as when removing/installing the cooking plate 34.

Turning now to the rear burner 72, the position of the rear burner 72 may be behind the cooking plate 34 and oriented to emit a flame toward the vaulted ceiling 40. In this regard, while the lower burner 70 provides heat below the cooking plate 34 along a horizontal axis, the rear burner 72 provides heat to the rear of the cooking plate 34, above the cooking plate 34 along a vertical axis. The flame generated by the rear burner 72 is deflected and dissipated by the vaulted ceiling 40 to distribute the heat generated therefrom to create generally uniform heat within the cooking chamber 28.

In more detail, the rear burner 72 includes a body 98 that is disposed about and extends along a rear burner axis 100 that intersects the vaulted ceiling 40. The body 98 includes a cylindrical lower section 102, a tapered section 104 defining a tapered passageway, an expanding section 106 defining an expanding passageway downstream of the tapered passageway, and a cylindrical upper section 108 defining a terminal end residing between a plane defined by the upper cooking surface 52 of the cooking plate 34 and the vaulted ceiling 40.

The contour of the tapered section 104 and the adjacent expanding section 106 is similar to a venturi to achieve desired flow characteristics of the gas flowing through the rear burner 72. In particular, the venturi-like configuration may increase the velocity of the gas flowing therethrough to create a blowtorch-like effect of the flame created by the rear burner 72. The blowtorch-like effect results in the flame impinging on the vaulted ceiling 40 with sufficient velocity to disperse the flame across or along the vaulted ceiling 40, thereby distributing the heat generated by the flame.

The rear burner 72 may include an internal flow control mechanism 110 that creates a desired flow pattern or distribution of the gas flowing therethrough. In the exemplary embodiment, the internal flow control mechanism 110 includes a plate or disc having eight (8) openings formed therein. The eight openings are equally spaced about the center of the plate and are positioned slightly below an ignitor 112, such that gas may flow through the openings and then ignited upon actuation of the ignitor 112.

The rear burner 72 may be secured by one or more support brackets 114 that may be rigidly interconnected to the outer housing. The rear bracket 114 shown in the drawing extends at least partially around the expanding section 106, and then over the upper section 108.

The oven 10 may additionally include a guard 115 for the rear burner 72, which extends around the rear burner 72. The guard 115 may be configured to prevent the pizza or other food item from inadvertently being advanced too far into the cooking chamber 28 so as to contact the rear burner 72. An upper edge of the guard 115 may be angled relative to the upper cooking surface 52, such that the forward portion of the upper edge is lower than the rearward portion of the upper edge. This angled configuration may facilitate movement of the flame emitted by the rear burner 72 in a forward direction, toward the food located in the cooking chamber 28.

The oven 10 may further include a rear support plate 117, which extends around the rear burner 72, and which may include one or more vent openings therein to allow for ventilation in the area below the rear support plate 117.

The oven 10 may also include a gas inlet 116 configured to be fluidly connectable to a gas source, with the gas inlet 116 being in fluid communication with the lower burner 70 and the rear burner 72. A manifold 118 may be in fluid communication with the gas inlet 116, the lower burner 70, and the rear burner 72, with the manifold 118 may be configured to receive gas from the gas inlet 116 and deliver received gas to the burners 70, 72.

The oven 10 may also include a first control valve connected to the manifold 118. The first control valve may be selectively transitional between an open position, wherein gas is permitted to flow from the manifold 118 to the lower burner 70, and a closed position, wherein gas is prevented from flowing from the manifold 118 to the lower burner 70. The first control valve may be selectively adjusted via a first control knob 120. The oven 10 may further comprise a second control valve connected to the manifold 118. The second control valve may be selectively transitional between an open position, wherein gas is permitted to flow from the manifold 118 to the rear burner 72, and a closed position, wherein gas is prevented from flowing from the manifold 118 to the rear burner 72. The second control valve may be selectively adjusted via a second control knob 122.

The ability to selectively vary the amount of gas flowing the lower burner 70 and rear burner 72 may allow a user to control the temperature within the cooking chamber 28, as well as the temperature profile within the cooking chamber 28. For instance, if a user wants to cook the top of the food item more than the bottom (e.g., to cook the toppings more), the user may increase the gas flow to the rear burner 72, while decreasing the gas flow to the bottom burner 70. Alternatively, if more heat is desired from the bottom and less on the top, the gas flow to the lower burner 70 may be increased, and the gas flow to the rear burner 72 may be decreased.

In order to optimize control of the heat profile within the cooking chamber 28, the oven 10 may include several thermometers that may provide readings on digital display or gauge viewable from outside of the cooking chamber 28. For instance, the display or gauge may be mounted on the outer housing 12.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A gas-powered oven for heating a food item, the oven comprising:
   an inner frame defining a cooking chamber having an opening, the cooking chamber being sized and configured to receive the food item, via the opening, for heating the food item therein, the inner frame including:
      a pair of opposed sidewalls disposed on opposite sides of a central axis; and
      a vaulted ceiling connected to the pair of opposed sidewalls, the vaulted ceiling having a central section, a rear section extending downwardly from the central section, and a front section spaced from the rear section and extending downwardly from the central section;
   a cooking plate disposed within the cooking chamber, the cooking plate having an upper surface parallel to the central axis;
   a pair of side brackets connected to respective ones of the sidewalls and configured to support the cooking plate, each side bracket including at least one cutout to facillitate heat transfer along the respective one of the sidewalls;
   a first burner configured to be connectable to a gas supply and positioned such that the cooking plate resides between the first burner and the vaulted ceiling; and
   a second burner configured to be connectable to the gas supply and extending along a second burner axis that intersects the vaulted ceiling, the second burner having a tapered passageway and an expanding passageway downstream of the tapered passageway to achieve desired flow characteristics of the gas flowing through the second burner.

2. The oven of claim 1, wherein the first burner includes a tapered passageway and an expanding passageway downstream of the tapered passageway to achieve desired flow characteristics of the gas flowing through the first burner.

3. The oven of claim 1, wherein the first burner includes an elongate body having a first array of openings formed therein, and a second array of openings formed therein and in opposed relation to the first array of openings.

4. The oven of claim 1, wherein the second burner includes a body extending about the second burner axis and defining the tapered passageway and the expanding passageway, the body defining a terminal end residing between a plane defined by the upper surface of the cooking plate and the vaulted ceiling.

5. The oven of claim 1, wherein the vaulted ceiling includes a pair of side sections, each extending downwardly from the central section in opposed relation to each other toward respective ones of the pair of sidewalls.

6. The oven of claim 1, wherein the vaulted ceiling includes an arcuate wall defining the central section.

7. The oven of claim 1, further comprising a gas inlet configured to be fluidly connectable to a gas source, the gas inlet being in fluid communication with the first burner and the second burner.

8. The oven of claim 7, further comprising a manifold in fluid communication with the gas inlet, the first burner and the second burner, the manifold being configured to receive gas from the gas inlet and deliver received gas to the first burner and the second burner.

9. The oven of claim 8, further comprising:
a first control valve connected to the manifold, the first control valve being selectively transitional between an open position, wherein gas is permitted to flow from the manifold to the first burner, and a closed position, wherein gas is prevented from flowing from the manifold to the first burner; and
a second control valve connected to the manifold, the second control valve being selectively transitional between an open position, wherein gas is permitted to flow from the manifold to the second burner, and a closed position, wherein gas is prevented from flowing from the manifold to the second burner.

10. The oven of claim 1, further comprising insulation extending over at least the vaulted ceiling.

11. The oven of claim 1, further comprising:
an outer housing surrounding at least a portion of the inner frame; and
a plurality of legs connected to the outer housing.

12. A gas-powered oven for heating a food item, the oven comprising:
a cooking surface;
a heat deflecting frame extending at least partially around the cooking surface, such that the cooking surface and heat deflecting frame collectively define at least a portion of a cooking chamber sized to receive the food item;
a pair of side brackets connected to respective opposed portions of the heat deflecting frame and configured to support the cooking surface, each side bracket including at least one cutout to facilitate heat transfer along the heat deflecting frame;
an outer housing extending around the cooking surface and the heat deflecting frame, the outer housing having an opening formed therein and in communication with the cooking chamber;
a first burner connectable to a gas source and located within the outer housing and spaced from the cooking chamber, the first burner being elongate and having at least a first array of openings formed therein; and
a second burner connectable to the gas source and extending into the cooking chamber toward a portion of the heat deflecting frame, the second burner having a tapered passageway and an expanding passageway downstream of the tapered passageway to achieve desired flow characteristics of the gas flowing through the second burner.

13. The oven of claim 12, wherein the first burner includes a tapered passageway and an expanding passageway downstream of the tapered passageway to achieve desired flow characteristics of the gas flowing through the first burner.

14. The oven of claim 12, wherein the first burner includes a second array of openings in opposed relation to the first array of openings.

15. The oven of claim 12, wherein the heat deflecting frame includes a vaulted ceiling positioned over the cooking surface and a plurality of sidewalls extending downwardly from the vaulted ceiling.

16. The oven of claim 12, further comprising a gas inlet configured to be fluidly connectable to a gas source, the gas inlet being in fluid communication with the first burner and the second burner.

17. The oven of claim 16, further comprising a manifold in fluid communication with the gas inlet, the first burner and the second burner, the manifold being configured to receive gas from the gas inlet and deliver received gas to the first burner and the second burner.

18. The oven of claim 12, further comprising insulation extending over at least a portion of the heat deflecting frame.

19. A gas-powered oven for heating a food item, the oven comprising:
an inner frame defining a cooking chamber having an opening, the cooking chamber being sized and configured to receive the food item, via the opening, for heating the food item therein, the inner frame including:
a pair of opposed sidewalls disposed on opposite sides of a central axis; and
a vaulted ceiling connected to the pair of opposed sidewalls, the vaulted ceiling having a central section, a rear section extending downwardly from the central section, and a front section spaced from the rear section and extending downwardly from the central section;
a cooling plate disposed within the cooking chamber, the cooking plate having an upper surface parallel to the central axis;
a first burned configured to be connectable to a gas supply and positioned such that the cooling plate resides between the first burner and the vaulted ceiling; and
a second burner configured to be connectable to the gas supply and extending along a second burner axis that intersects the vaulted ceiling, the second burner including a body extending about the second burner axis and defining a tapered passageway, an expanding passageway, and a terminal end, the body being configured such that the terminal end and the tapered passageway are on opposite sides of a plane defined by the upper surface of the cooking plate.

20. The oven of claim 19, wherein the inner frame and the second burner are configured such that during use, the second burner generates a flame that impinges on a portion of the vaulted ceiling.

* * * * *